United States Patent [19]

Touchman et al.

[11] 3,735,165
[45] May 22, 1973

[54] PERMANENT MAGNET TYPE TORSIONAL STEPPING MOTOR

[75] Inventors: William S. Touchman, Kettering, Ohio; John D. Hays, Ithaca, N.Y.

[73] Assignee: The National Cash Register Company, Dayton, Ohio

[22] Filed: July 6, 1972

[21] Appl. No.: 269,477

[52] U.S. Cl. ................................ 310/49, 310/75 D
[51] Int. Cl. .............................................. H02k 37/00
[58] Field of Search ............... 310/49, 37, 162–164, 310/80, 84, 75, 20, 75 C, 24, 75 D, 102, 104, 117, 118, 121, 154; 318/138, 685, 696

[56] References Cited

UNITED STATES PATENTS

| 3,456,139 | 7/1969 | Newell | 310/49 |
| 2,772,546 | 12/1956 | Barrows | 310/75 D |
| 2,734,359 | 2/1956 | Mulheim | 310/75 D |
| 1,813,177 | 7/1931 | Lenehan | 310/119 |
| 1,517,285 | 12/1924 | Fischedick | 310/75 D |

Primary Examiner—R. Skudy
Attorney—J. T. Cavender, Wilbert Hawk and George J. Muckenthaler

[57] ABSTRACT

An incremental rotary motion device or stepping motor has a plurality of permanent magnet rotor assemblies which are connected by means of a torsionally resilient coupling member. The coupling member is in the form of a torsion spring which is capable of storing and releasing energy for aiding in incrementally advancing one rotor assembly and then the other rotor assembly in sequential manner. A bucking coil is positioned around each rotor and is pulsed to divert the magnetic lines of force emanating from the permanent magnet thereby allowing the releasing and storing of energy of the coupling member to advance the output shaft.

20 Claims, 4 Drawing Figures

Patented May 22, 1973

PERMANENT MAGNET TYPE TORSIONAL STEPPING MOTOR

BACKGROUND OF THE INVENTION

Stepping or indexing mechanisms for driving or advancing material have been used for a number of years where it has been desirable to drive or advance tapes, record material, films or the like in incremental manner without the use of complex clutch and brake mechanisms. In recent years, the use of stepping motors in the processing of data has become increasingly important by reason of the requirements of high speed operation, along with precise positioning of the data carriers during the travel thereof within the processing system. In this respect, magnetic and electromagnetic motors are commonly used to obtain the desired motion through the drive mechanism where such a mechanism is adaptable for effecting the stepping action.

An example of the prior art which shows improvements in or relating to magnetic motors is disclosed in British Pat. No. 989,172, on the application of Electric and Musical Industries, Limited, wherein a magnetic stepping motor comprises a first and a second set of stators and rotors, the rotors being mounted on a common, non-ferrous sleeve which, in turn, is carried on a shaft and wherein magnetic flux is established between the teeth of the stators and the rotors to cause step-by-step rotation of the rotors.

Another example of the prior art is disclosed in U.S. Pat. No. 3,143,674, on the application of G. V. Bond, wherein a rotor stepping mechanism comprises co-axial electromagnetic rotor-stator assemblies carried on a hollow shaft, and upon energization of the associated coils, the rotors turn through limited angles in opposite directions. Additionally, the mechanism comprises differential gearing connecting the rotors to insure equal and opposite movement, restoring means in the form of a torsion bar within the shaft to restore the rotors to their normal positions, and a one-way drive latching member associated with the output member.

U.S. Pat. No. 3,293,459, on the application of K. G. Kreuter and L. S. Smith, shows and describes a stepping motor having a permanent magnet with rotor sections fixed on a common rotary shaft, and stator windings to augment the magnet.

Likewise, U.S. Pat. No. 3,439,200 discloses a reversible stepping motor with braking coils and biasing permanent magnets.

A further example of the prior art is the intermittent motion apparatus shown and described in U.S. Pat. No. 3,460,343 on the application of W. S. Touchman, wherein a continuously rotating input means and an output means are connected by resilient means.

Finally, U.S. Pat. No. 3,522,201 on the application of A. Nyman, discloses paper feed tractors each connected to a compact incrementing motor device wherein the holding and the drive pole teeth are connected to permanent magnets. A coil is provided in association with each of the sets of pole teeth and a control circuit operates to pulse the coils in selected patterns to either step or rotate the armature continuously.

It is thus seen that the prior art does not show the combination of a torsion spring and permanent magnet construction in incremental or stepping motion between input and output members. While these patents disclose particular constructions and stepping actions, it is desirable to provide a stepping motor for increased reliability, for fast starting, and at low cost.

SUMMARY OF THE INVENTION

The present invention relates to stepping motors and more particularly to a stepping motor having a torsion spring which stores energy therein and which releases energy therefrom to drive an output member in incremental manner. Secured to the torsion spring at each end thereof is a rotor assembly having a plurality of teeth on the periphery thereof and associated with each rotor assembly is a stator contained in a housing, the stator having a plurality of teeth corresponding to those of the rotor. Each rotor-stator assembly has a permanent magnet to provide magnetic lines of flux in a path to the rotor assembly for use in the operation of incrementally moving the rotor in relation to the stator. A bucking coil is utilized with each permanent magnet wherein the coil is pulsed to thereby cause rerouting of the lines of magnetic flux from the normal path and permit energy stored in the torsion spring to be released and thereby rotate the output member an incremental amount in a rotary direction. The rotor assemblies are, in effect, two magnetically latchable devices, controllable by the pulses from the bucking coils in the storing and releasing of magnetic energy.

An initial set-up condition is made prior to any stepping action wherein the torsion spring is wound-up and made ready to advance the output member or load an angular amount by simply releasing the magnetic latch adjacent the output member. The stored energy in the torsion spring is imparted to the output member to accelerate it to a peak velocity in approximately one-quarter cycle of the spring-mass system. Energy is then again stored in the torsion spring to decelerate the output member to the stopped position at substantially the end of the step for a total of one-half cycle of the resonant frequency of the spring-mass system. The initial wind-up of the torsional spring is equivalent to one-half the tooth spacing so that a sequenced pulse of both magnetic rotor assemblies accomplishes one step of the output member.

In accordance with the above discussion, it is the principal object of the present invention to provide means for very rapidly accomplishing incremental motion in an output member.

A further object of the invention is to provide a stepping motor having fast starting capability with a high output torque.

Another object of the present invention is to provide a stepping motor wherein energy is stored in an released from a torsion spring during each operating cycle.

An additional object of the present invention is to provide a low cost stepping motor.

Still a further object of the present invention is to provide permanent magnet excitation in the latching assemblies of a stepping motor and with a torsion spring coupling the latching assemblies.

Still another object of the present invention is to provide a stepping motor that has high starting torque and small physical size.

Still an additional object of the present invention is to provide a stepping motor wherein a single step is initiated by a single current pulse to buck the magnetic flux and allow the torsion spring torque to be maximized for starting.

And a final object of the present invention is to provide a stepping motor with increased magnetic latching capabilities.

Additional advantages and features of the present invention will become apparent and fully understood from a reading of the following description taken together with the annexed drawings, in which.

Figure 1:
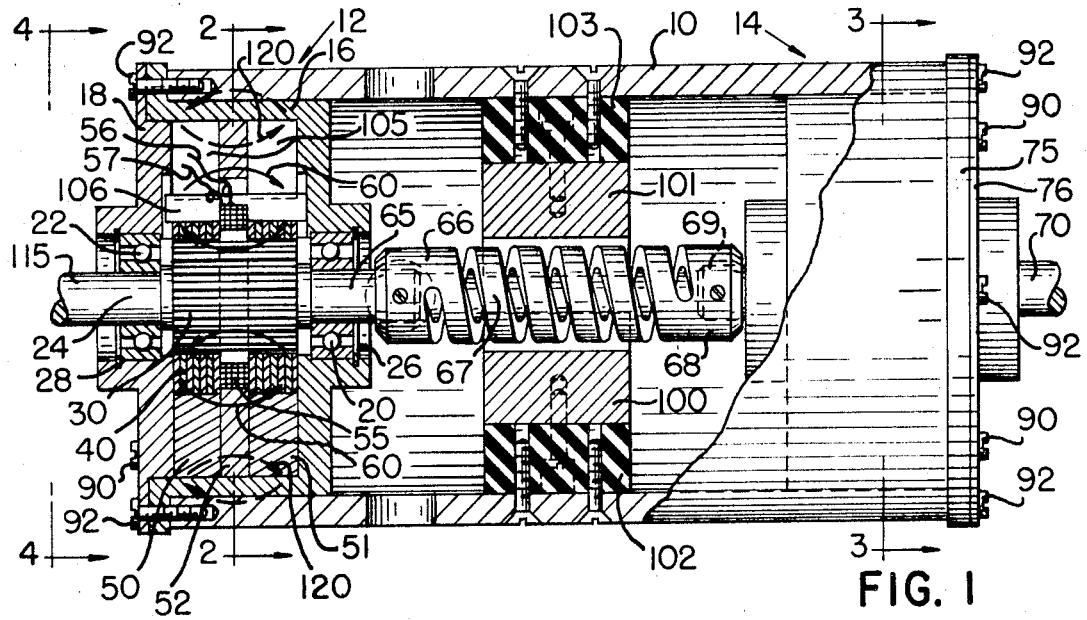
FIG. 1 is a cross sectional view of a stepping motor made according to the present invention.
Figure 2:
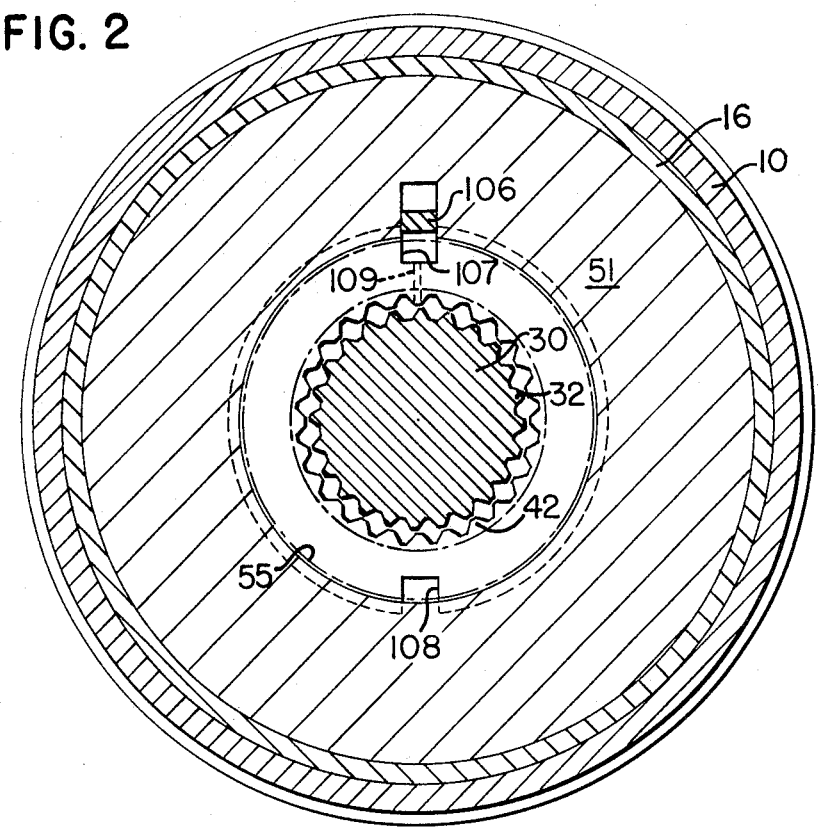
FIG. 2 is a view taken on the line 2—2 of FIG. 1.

Referring to FIG. 1, a stepping motor made in accordance with the present invention has a cylindrical body 10 of mild steel or other soft, magnetic material which houses two magnetic latch assemblies indicated generally as 12 and 14, it being understood that although assembly 14 is shown in outline only, it is identical in construction as that of assembly 12 to form an integral part of the other end of the motor. The latch assembly 12 comprises a magnet housing in the form of a bowl 16 and an end plate 18 as a cover for the bowl and which bowl and plate house ball bearings 20 and 22. Bearings 20 and 22 are restricted from axial movement along a shaft 24 by means of retaining rings 26 and 28, the bearings allowing rotary motion of a rotor 30 affixed to the shaft 24. Rotor 30 is made of soft magnetic material and includes a plurality of teeth 32 around the periphery thereof, as best seen in FIG. 2.

The latch assembly 12 contains a stator 40 made of a plurality of laminations of soft, magnetic material, the laminations having a plurality of teeth 42, similar in shape to the teeth 32 of rotor 30, around the inner periphery of the stator. In the several drawings, there are shown 24 equally spaced rotor teeth 32 to match with 24 companion teeth 42 on the stator.

A pair of magnet rings 50 and 51 encircle the stator 40 and contain a permanent magnet 52 therebetween, with the magnet also encircling the stator. A bucking coil 55 is nestably positioned in a space between two groups of stator laminations, encircling the rotor 30, and within the inner periphery of the permanent magnet 52. Leads 56 and 57 are brought out from the coil 55 to a convenient and accessible terminal for connection to a control circuit (not shown). The arrangement of the stator laminations, the rotor 30, the magnet rings 50 and 51, and the permanent magnet 52 completes a closed magnetic path 60 across the rotor teeth 32 and the stator teeth 42, whereby a magnetic latching effect is realized by the field of flux generated by the permanent magnet 52.

Figure 3:
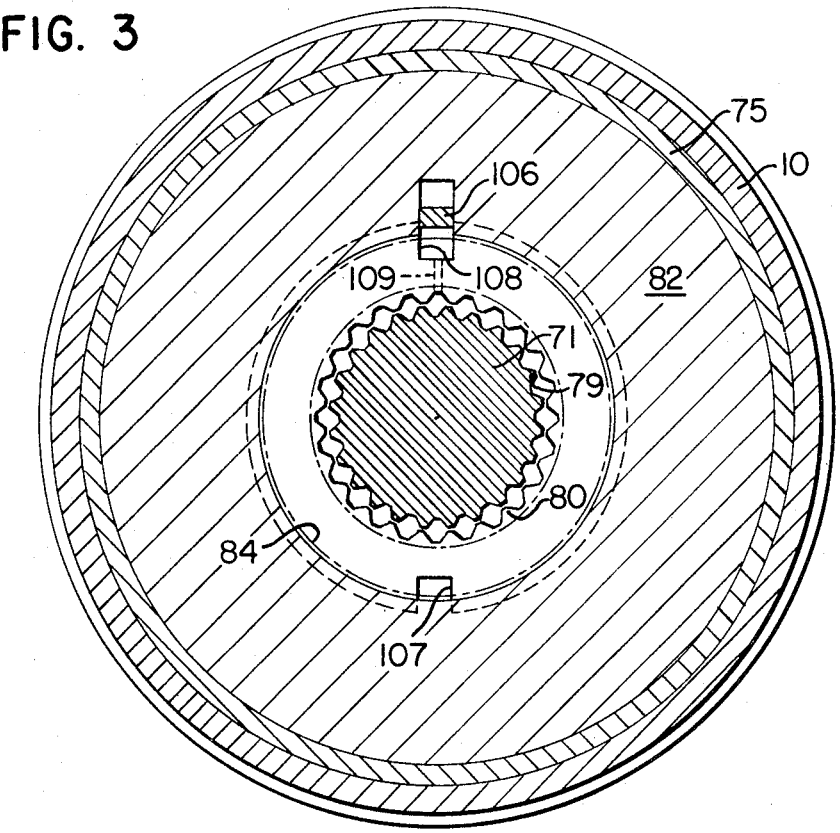
FIG. 3 is a view taken on the line 3—3 of FIG. 1.

The shaft 24 extends beyond the bearings 20 and 22, and one end 65 thereof is rigidly secured to one end 66 of a spring 67, which spring extends in axial position from the shaft 24 and has the other end 68 thereof rigidly secured to one end 69 of a shaft 70 carrying the rotor 71 (FIG. 3) of latch assembly 14. It is thus seen that the torsion spring 67 couples the latch assembly 12 with latch assembly 14 which assembly 14 comprises the identical parts such as the magnet housing bowl 75 and the end plate 76 containing the ball bearings, and the rotor 71 with its teeth 79 corresponding to the teeth 80 of the stator. Likewise latch assembly 14 has a pair of magnet rings, a permanent magnet 82, and a bucking coil 84 arranged identically as the parts of assembly 12.

Figure 4:
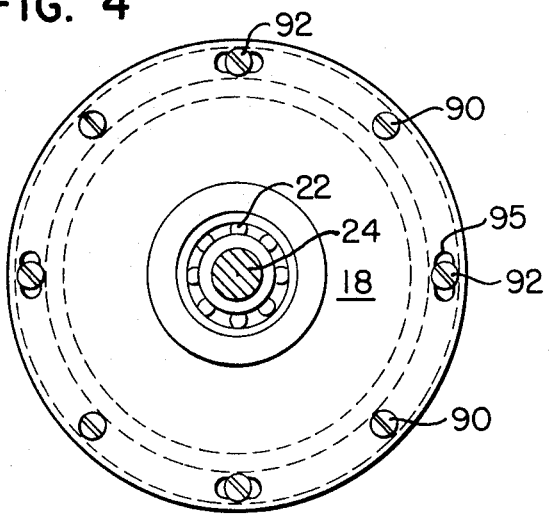
FIG. 4 is an end view taken on the line 4—4 of FIG. 1.

The magnet housings 16 and 75 are secured to the end plates 18 and 76, respectively, by means of evenly spaced screws 90 as seen in the left hand view in FIG. 4, the right hand view being similarly constructed. Along with this design, the two latch assemblies 12 and 14 are made in a manner such that the teeth 42, 80 of all the stator laminations are aligned parallel with the axes of rotors 30 and 71. All stator teeth 42 of assembly 12 are rotatably displaced 7-½° from all stator teeth 80 of assembly 14 at the time of the motor assembly. Such displacement of the stators 40, 84 causes the spring 67 to be wound up so that the teeth 32 of rotor 30 are displaced from the teeth 79 of rotor 71 by an angular amount substantially at the mid-point between the rotor and stator teeth. The latch assemblies are secured to the body 10 by means of evenly spaced screws 92, located midway between the screws 90, and operating in elongated slots 95 in the end plates 18 and 76 to enable rotation and securing of the latch assembly 12 to the body 10 in relation to the latch assembly 14. This is essential for the initial set-up condition so that there is a spring wind-up of one-half the tooth spacing, e.g., 7-½° for a rotor-stator arrangement having 24 teeth. A pair of capacitor plates 100 and 101 fit closely around the spring 67 and are mounted on insulator blocks 102 and 103, secured to the body 10, as shown in FIG. 1.

The magnet rings 50, 51 have a radial slot 105 which serves to prevent the flow of the shorted turn eddy currents when either of the coils 55 or 84 is energized, and also the slot 105 provides room for a key 106 which is used to align the stator laminations 40 by means of the slots 107 therein. The slots 108 in the laminations are used for wire clearance only. The narrow slot 109 in the laminations is optional and tends to prevent flow of the single turn eddy current, although the slot 109 is desirable for very fast cycling of the latch mechanism.

In the operation of the stepping device, either end 115 of shaft 24 or the outer end of shaft 70 may be used to connect to the load. If the load is connected to shaft end 115, it would be advantageous to connect a dummy inertia, equal to the load inertia, to the end of shaft 70 which would keep the system balanced about a line perpendicular through the center of the spring 67. Assuming that the load is connected to end 115 of shaft 24, the rotation of the load will be determined by observing the motor from the left hand end of FIG. 1. If the rotor 30 (FIG. 2) has been rotated approximately 7½° clockwise with respect to rotor 71 in latch assembly 14 at assembly (by rotating the end plate 18 and adjusting and tightening the screws 92 in slots 95 at the left hand end of the motor), the spring 67 will store energy therein by the torsional effect and the working turns of the coils of spring 67 will increase in diameter due to the right hand pitch of the spring. Conversely, a counter-clockwise rotational wind-up of the spring will also store torsional energy, but in the reverse direction, and will decrease the diameter of the spring. Albeit the amount of increase or decrease is small, the energy stored in a relatively short spring is sufficient to effect movement of the rotor in a very fast stepping action. It should be noted that, in FIG. 2, the rotor teeth 32 are not quite aligned with the stator teeth 42, the offset being in the order of ½° to 1½°.

When it is desired to admit the first step, after setting up the displacement of the rotor teeth 32 from the stator teeth 42 and attaching a load to shaft end 115, the bucking coil 55 is pulsed which effects the rerouting of the magnetic flux along a by-pass path as indicated by the arrows 120 in FIG. 1 and thereby releases the magnetic latch which has heretofore been sustained by the rotor and stator teeth. Assuming a desired clockwise direction of rotation of the output shaft 115, the pulsing of coil 55 permits the shaft to rotate clockwise a partial step, after which the pulsing of coil 84 reroutes the flux in assembly 14 and permits the spring to advance the shaft 70 in the same or clockwise direction to complete one step. The momentary pulsing of the coil 55 thus allows the rotor 30, its shaft 24, and the load to advance a partial step under the resilient urgence of spring 67 in a direction dependent upon the prior phase relationship between the rotors 30 and 71. The coil 55 can be pulsed at the completion of the first partial step whereby the load returns to the original start position in essentially one-half cycle time of the spring-mass system which consists of the spring 67 and the rotor 30. Conversely, rotor 71 can be prepositioned prior to indexing the load by pulsing the coil 84 in the magnetic latch assembly 14.

The electrical drive circuitry for the motor may be any suitable circuit which allows only one of the two coils, 55 or 84, to be pulsed at one time. It is entirely possible to maintain a count of the pulses sent to coil 55, as well as knowing the wind-up condition of the spring 67, as previously described, and the position of the load will be known at all times. By keeping a count of the pulses to both coils 55 and 84, it is not necessary to use the capacitance sensors 100 and 101, if the initial condition of spring 67 is known. However, the sensors or plates 100 and 101 can be connected to an alternating-current voltage and, by measuring the current flow, the phase relationship between rotors 30 and 71 will be known at all times.

It is thus seen that herein shown and described is a stepping motor which has extremely fast starting characteristics wherein a single step is initiated by a single current pulse which "bucks out" the permanent magnet flux and allows the maximum spring torque to start the acceleration of the load inertia. The accuracy of detenting of the load is a function of the rotor and stator tooth design and therefore does not adversely affect the fast starting characteristic of the motor. Since all step times are directly related to the resonant frequency of the spring-mass system, there is very little chance of losing a step. Additionally, the acceleration and deceleration of the load is generally consistent due to the harmonic motion of spring 67 as opposed to the non-linear pull of magnetic forces in other stepping motors.

Another feature is effected during the time that the motor steps the load in continuous manner wherein the action is that of an intermittent motion mechanism and where the load is completely at rest for one-half cycle for those applications requiring a function to occur during the dwell period, e.g., a paper tape punch.

A further advantage is realized in the manner of latching the rotor 30 or 71 to the motor frame only as opposed to magnetically advancing the rotor. By reason of the fact that all the teeth are used for latching, at least three times the torque is achieved over that of other motors. The positioning of the permanent magnet in the stator section also provides for a greater concentration of flux across the two working air gaps (the rotor and stator teeth area) and with the use of all the teeth, the latching capabilities are greatly increased.

The apparatus enables the accomplishment of the objects and advantages mentioned above, and while only one embodiment of the invention has been disclosed herein, certain variations may occur to those skilled in the art. It is contemplated that all such variations, not departing from the spirit and scope of the invention hereof, are to be construed in accordance with the following claims.

What is claimed is:

1. A stepping motor comprising a
   first magnetically latchable assembly, a
   second magnetically latchable assembly, a
   torsionally resilient coupling member connecting said first and second latchable assemblies, and
   means for alternately latching and unlatching said first and second assemblies for rotating the ends of said coupling member in incremental manner in the same direction, said means including a first coil and a second coil adjacent the first and second latchable assemblies, respectively, the energization of the first coil causing latching of the first assembly to capture said assembly in relation to one end of the coupling member, and the energization of the second coil causing latching of the second assembly to capture said assembly in relation to the other end of the coupling member while deenergizing the first coil to allow the first magnetically latchable assembly to advance one end of the coupling member in said direction beyond the latched position of the second assembly thereby subjecting the coupling member to a torsional condition, the deenergization of the second coil permitting the second magnetically latchable assembly to advance the other end of the coupling member in said direction beyond the latched position of the first assembly thereby subjecting the coupling member to a torsional condition in successive manner.

2. The motor of claim 1 wherein the first and the second magnetically latchable assemblies include rotor elements carried on a shaft, and stator elements containing permanent magnets for forming a magnetic path across the rotor and stator elements.

3. The motor of claim 1 wherein the torsionally resilient coupling member is a spring capable of incremental rotation alternately at the ends thereof in response to energization and deenergization of the first and second coils.

4. The motor of claim 2 wherein the first and second coils are bucking coils energized to alternately oppose the permanent magnets and thereby divert the magnetic path to permit the ends of the coupling member to advance in said direction.

5. In a stepping motor having an output end for delivering rotary motion in incremental manner,
   first magnetically latchable means including a rotor element and a stator element,
   second magnetically latchable means including a rotor element and a stator element, a
   torsionally resilient coupling member connecting the rotor elements, and
   means adjacent said first and said second latchable means capable of alternately causing latching and unlatching of said latchable means to rotate one rotor element while holding the other rotor element from rotation, the latching of the first latchable means aligning the first rotor and stator elements while permitting the second rotor element to incrementally advance to a position wherein the coupling member is subjected to a torsional condition resulting in stored energy therein, and the latching of the second rotor element permitting the first rotor element to incrementally advance to a position wherein the coupling member is subjected to a torsional condition to release the stored energy therein and thereby rotate the first rotor element and the output end a predetermined incremental distance.

6. In the stepping motor of claim 5 wherein the first and second latchable means includes a first and a second permanent magnet encircling the respective rotor elements.

7. In the stepping motor of claim 5 wherein the first and the second latchable means each include a bucking coil alternately energized to divert the magnetic path for permitting the coupling member to rotate the respective rotor element in incremental manner.

8. Incremental motion apparatus comprising:
   first energy transducer means including first rotor magnetically-latchable means for converting magnetic energy into incremental rotation mechanical energy,
   second energy transducer means including second rotor magnetically-latchable means for converting magnetic energy into incremental rotation mechanical energy,
   rotationally resilient coupling means connected at one end thereof to said first rotor means and at the other end thereof to said second rotor means for torsionally storing and for transmitting between said two rotor means portions of said incremental rotational mechanical energy and for urging said first and second rotor means toward rotationally displaced rotational positions, and
   means for diverting magnetic energy to alternately latch and unlatch the first and second transducer means.

9. The incremental motion apparatus of claim 8 wherein each of said first and second energy transducer means includes stator means having a permanent magnet positioned therein.

10. The incremental motion apparatus of claim 8 wherein the magnetic energy diverting means are coils adjacent the respective rotor means to divert the magnetic energy along a path remote from the rotor means and thereby alternately permit the ends of the resilient coupling means to advance the first and the second rotor means.

11. The incremental motion apparatus of claim 8 wherein the rotationally resilient coupling means is a torsion spring.

12. The incremental motion apparatus of claim 11 wherein the first and second rotor means each include a shaft and said torsion spring is secured to said shafts.

13. A method of incrementally rotating the ends of a stepping motor having a first and a second magnetically latchable rotor-stator assembly connected by a torsionally resilient coupling, comprising the steps of
   setting the first rotor-stator assembly in a condition to provide torsional energy in said coupling,
   unlatching the first rotor-stator assembly to permit one end to freely rotate an angular distance in one direction,
   latching the first rotor-stator assembly in a position to provide torsional energy in said coupling,
   unlatching the second rotor-stator assembly to permit the other end to freely rotate an angular distance in said direction, and
   latching the second rotor-stator assembly in a position to provide torsional energy in said coupling.

14. The method of claim 13 wherein the resilient coupling is a torsion spring.

15. The method of claim 13 wherein each of the first and the second magnetically-latchable rotor-stator assemblies includes a permanent magnet.

16. The method of claim 15 wherein each of the first and the second magnetically latchable rotor-stator assemblies includes a conductive coil for diverting the magnetic fields of the permanent magnets.

17. A method for actuating an intermittent motion apparatus of the type having two magnetically latchable assemblies wherein each device includes an incrementally rotating rotor portion joined to an opposed rotor portion by a resilient coupling member, the assemblies having incremental positions that are rotationally misaligned by one-half of a rotor increment, comprising the steps of setting one assembly in an incrementally-misaligned rotational position to subject the coupling member to a torsional condition in relation to one end thereof,
   unlatching said one assembly to permit one rotor portion to rotate into a first rotor incremental position by diverting the field of said one assembly,
   latching said one assembly after said one rotor portion has rotated into the first incremental position,
   unlatching the other assembly to permit the other rotor portion to rotate into a second rotor incremental position by diverting the field of the other assembly, and
   latching the other assembly after the other rotor portion has rotated into the second incremental position.

18. The method of claim 17 including repeating the steps of unlatching and latching the magnetic assemblies until the rotor portions attain a predetermined rotational position.

19. The method of claim 17 wherein the latchable assemblies include permanent magnets and a conductive coil to divert the magnetic field to unlatch the rotor portions.

20. The method of claim 17 wherein the resilient coupling member is a torsion spring.

* * * * *

UNITED STATES PATENT OFFICE
CERTIFICATE OF CORRECTION

Patent No. 3,735,165          Dated May 22, 1973

Inventor(s) William S. Touchman and John D. Hays

It is certified that error appears in the above-identified patent and that said Letters Patent are hereby corrected as shown below:

Column 2, line 51, change "an" to -- and --.
Column 4, line 11, change "stators 40,84 to
       -- stator teeth 42 and 80 --.

Column 6, line 20, change "energization" to
       -- deenergization --.
Column 6, line 23, change "energization" to
       -- deenergization --.
Column 6, lines 26 and 27, change "deenergizing" to
       -- energizing --
Column 6, line 32, change "deenergization" to
       -- energization --.

IN THE DRAWING

Fig. 2, change "51" to -- 52 --.

Signed and sealed this 22nd day of January 1974.

(SEAL)
Attest:

EDWARD M. FLETCHER, JR.      RENE D. TEGTMEYER
Attesting Officer               Acting Commissioner of Patents